United States Patent

[11] 3,573,378

[72] Inventors Derek Leyburn
St. Laurent, Quebec;
James S. Kyles, Pointe Claire, Quebec,
Canada
[21] Appl. No. 720,636
[22] Filed Apr. 11, 1968
[45] Patented Apr. 6, 1971
[73] Assignee The Bell Telephone Co. of Canada
Montreal, Quebec, Canada

[54] TELEPHONE CALL TIMING CIRCUIT
6 Claims, 3 Drawing Figs.

[52] U.S. Cl. 179/7.1
[51] Int. Cl. H04m15/18
[50] Field of Search 179/7.1; 58/39.5, 145, 152 (T)

[56] References Cited
UNITED STATES PATENTS
2,404,654 7/1946 Potts 179/7.1
2,488,797 11/1949 Baker 179/7.1

OTHER REFERENCES
General Electric Transistor Manual, Seventh Edition (1964) pp 131— 134

*Primary Examiner*—Kathleen H. Claffy
*Assistant Examiner*—Jan S. Black
*Attorney*—Curphey and Erickson

ABSTRACT: A timing circuit which includes a pulse generator for generating a train of timed pulses for the duration of a data call on a telephone line. A first counting circuit repeatedly counts a predetermined number of pulses and generates an output pulse at the end of each group of pulses. A second counting circuit counts a predetermined number of output pulses from the first counting circuit and generates a further output pulse which operates a relay to energize an overtime register and disable the second counting circuit. The overtime register subsequently registers every time the first pulse of a group of pulses is counted.

FIG. I

*INVENTORS*
D. LEYBURN
J.S. KYLES
AGENTS
Curphey & Erickson

*INVENTORS*
D. LEYBURN
J.S. KYLES
AGENTS
Curphey & Erickson

TELEPHONE CALL TIMING CIRCUIT

This invention relates to telephone call timing circuit and more particularly to circuits for providing timing and charging facilities for data type calls using regular telephone lines.

The rate structure in use for automatic ticketing of toll calls includes a minimum basic charge for a predetermined time interval and an overtime charge in which a selected increment of cost is added to the basic charge for various overtime intervals. There has been a need for a simple, fast operating timing circuit particularly suited for individual applications to data lines, and to measuring the duration of data calls, which may be as short as, for example, 10 seconds. Having that in mind, the timing circuit, in accordance with the invention includes a pulse generator for generating a train of timed pulses representative of the time duration of a call in seconds. The timing circuit further includes a first counting circuit for repeatedly counting a predetermined number of the pulses, each predetermined number of pulses forming a group of pulses, and a second counting circuit responsive to the first counting circuit for counting the above groups of pulses and for energizing an overtime register when a predetermined number of groups of pulses has been counted. The overtime register subsequently registers every time a group of pulses are counted.

The above circuit may be arranged to operate a call register when the first pulse is counted to register the call.

The invention will now be described with reference to the drawings which represent a preferred embodiment of the invention and in which.

When a toll call is answered, a ground is placed on lead CH from the trunk circuit, as commonly known, to operate relay CH from potential source E1. The operation of relay CH closes contacts CH–1 to connect the pulse generator PG to flip-flop circuit 10. The operation of relay CH also closes contacts CH–2 and CH–3 for the pulse countings circuits of FIGS. 1 and 2 respectively. In addition, the operation of relay CH closes contacts CH–4 for initiating a circuit for the register circuit of FIG. 3.

On the first pulse generated by generator PG, relay PA is energized through the circuit comprising potential source E2, resistor R2, relay PA, contacts PA–1, operated contacts CH–1, operated contacts PG–1 and ground. Contacts PG–1 of pulse generator PG operate and release at a rate of one interruption per second to generate a basic train of pulses of one pulse per second. Relay PA locks operated through its own contacts PA–1 and contacts CH–5. Relay PB does not operate for the duration of the pulse as it is shunted by its own released contacts PB–1.

When the ground pulse is removed, relay PB is operated through the circuit comprising potential source E3, resistor R3, relay PB, operated contacts PA–1, operated contacts CH–5 and ground. Relays PA and PB remain operated until the next ground pulse from pulse generator PG. Relays PA and PB of flip-flop circuit 10 are then in a "set" condition.

Figure 1:
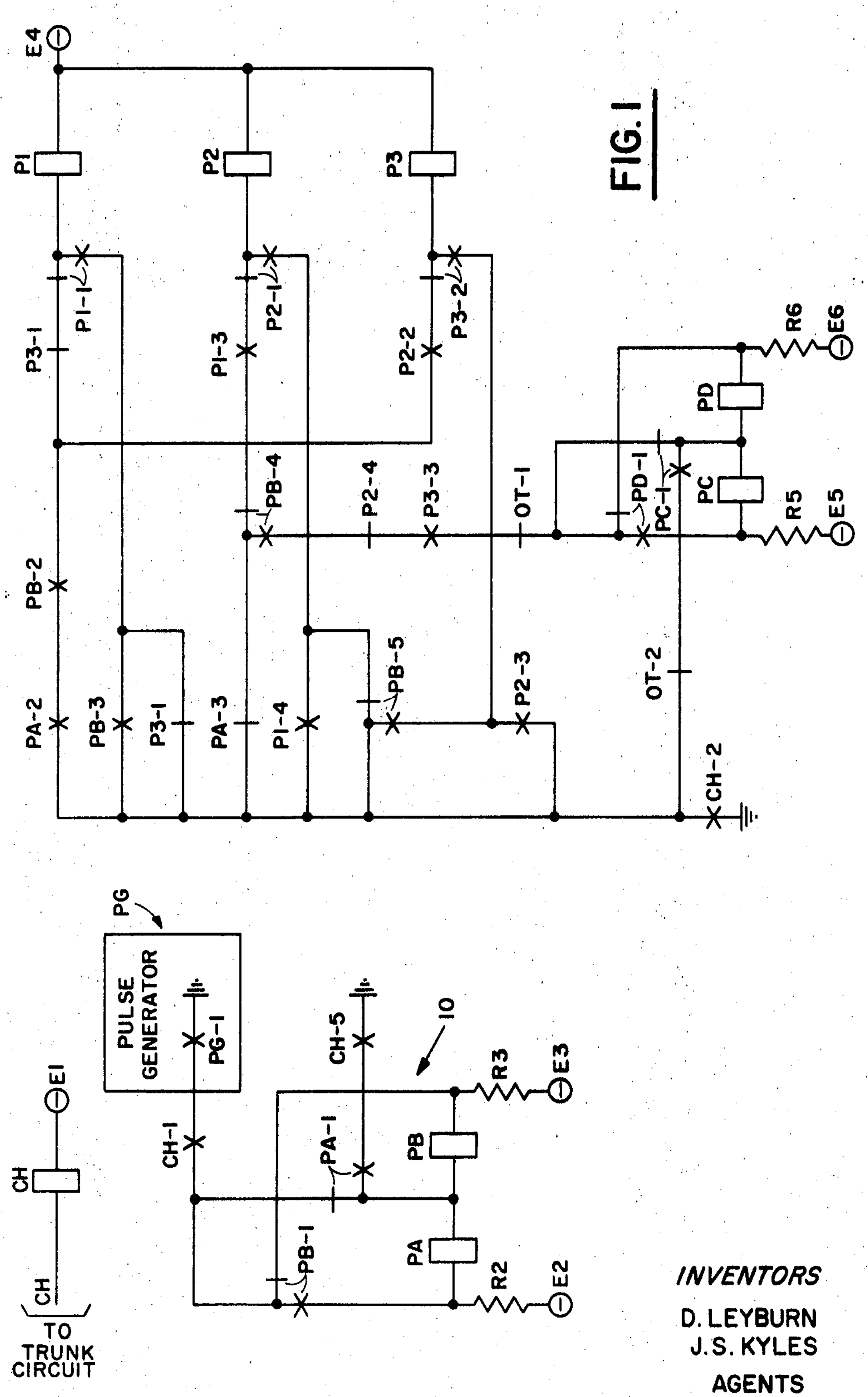
FIG. 1 illustrates a pulse counting circuit for counting a predetermined number of pulses generated by a pulse generator.

The operation of relays PA and PB closes contacts PA–2 and PB–2 of the pulse counting circuit of FIG. 1 and operates relay P1 through the circuit comprising potential source E4, relay P1, released contacts P1-1 and P3-1, operated contacts PA–2, PB–2, CH–2 and ground. Relay P1 locks operated through its own contacts P1–1 and contacts PB–3 of relay PB or contacts P3–1 of relay P3. The operation of relay P1 counts the first pulse generated by pulse generator PG and in closing contacts P1-2 in FIG. 3 operates the call register relay C to register the beginning of the call. The registration of the call follows the generation of the first pulse which is representative of the starting time of the call. If the pulse generator operates at the frequency of one pulse per second, the call registration is made within one second after initiation of the call. The call register is not disclosed in detail since it is well known in the art.

On the next ground pulse from pulse generator PG, relay PA is shunted through contacts PB–1 of operated relay PB and is consequently released. Relay PB remains operated for the duration of the pulse. When ground is removed from relay PB by the opening of contacts PG–1, relay PB is released. Relays PA and PB are, therefore, both released after the second pulse of pulse generator PG and the flip-flop circuit is said to be in a "reset" condition. The flip-flop circuit continues to operate or release (set or reset) on each alternate ground pulse from the pulse generator PG for the duration of the call.

When both relays PA and PB are released after the operation of relay P1, relay P2 of the pulse counting circuit is operated through the circuit comprising potential source E4, relay P2, contacts P2–1, operated contacts P1-3, released contacts PA–3 and PB–4, operated contacts CH–2 and ground. Relay P2 locks operated through its own contacts P2–1 and released contacts PB–5 of relay PB or operated contacts P1–4 of relay P1. The operation of relay P2 counts the second pulse generated by the pulse generator PG. Relay P1 remains operated because contacts P3–1 of relay P3 are still closed.

After the third pulse of pulse generator PG, relays PA and PB are reoperated and relay P3 of the pulse counting circuit is operated to count the third pulse generated by the pulse generator through a circuit including potential source E4, relay P3, released contacts P3–2, operated contacts P2–2, operated contacts PA–2, PB–2 and CH–2 and ground. Relay P3 locks operated through its own contacts P3–2 and operated contacts PB–5 or P2–3 of relays PB and P2 respectively. Relay P1 remains operated through operated contacts PB–3. Relay P2 remains operated through contacts P1–4.

After the fourth pulse from pulse generator PG, relays PA and PB are released. The release of relay PB opens contacts PB–3 and releases relay P1. Relay P2 remains operated through released contacts PB–5. Relay P3 remains operated through operated contacts P2–3 of relay P2.

After the fifth pulse from pulse generator PG, relays PA and PB are operated. The operation of relay PB opens contacts PB–5 and releases relay P2. Relay P3 remains operated through operated contacts PB–5.

After the sixth pulse from pulse generator PG, relays PA and PB are released. The release of relay PB opens contacts PB–5 and releases relay P3.

The pulse counting relays operate in accordance with the following table:

| | Relay operated | | | | |
|---|---|---|---|---|---|
| Pulse: | | | | | |
| 1 | PA | PB | P1 | ---- | ---- |
| 2 | ---- | ---- | P1 | P2 | ---- |
| 3 | PA | PB | P1 | P2 | P3 |
| 4 | ---- | ---- | ---- | P2 | P3 |
| 5 | PA | PB | ---- | ---- | P3 |
| 6 | ---- | ---- | ---- | ---- | ---- |
| 7 | PA | PB | P1 | ---- | ---- |

and the above sequence is repeated for the duration of the call to repeatedly count a predetermined number of the pulses generated by the pulse generator PG.

Each time the combination of operated counting relays is PB and P3 only (when the sixth ground pulse is applied to flip-flop circuit 10 to release relay PA while relay PB is still energized), a ground pulse is applied to relay PC of flip-flop circuit 11 th9ough the circuit comprising potential source E5, resistor R5, relay PC, released contacts PC–1, OT–1, operated contacts P3–3, released contacts P2–4, operated contacts PB–4, released contacts PA–3, operated contacts CH–2 and ground. Relay PC locks operated through its own contacts PC–1 and released contacts OT–2. Relay PD is shunted by its own contacts PD–1 and operates only after PB is released after the sixth pulse. The flip-flop circuit 11 functions the same way as flip-flop 10 and is set and reset on each alternate ground pulse from the pulse counting circuit of FIG. 1, that is, after the sixth, the 12th, the 18th, the 24th and the 30th pulse.

Figure 2:
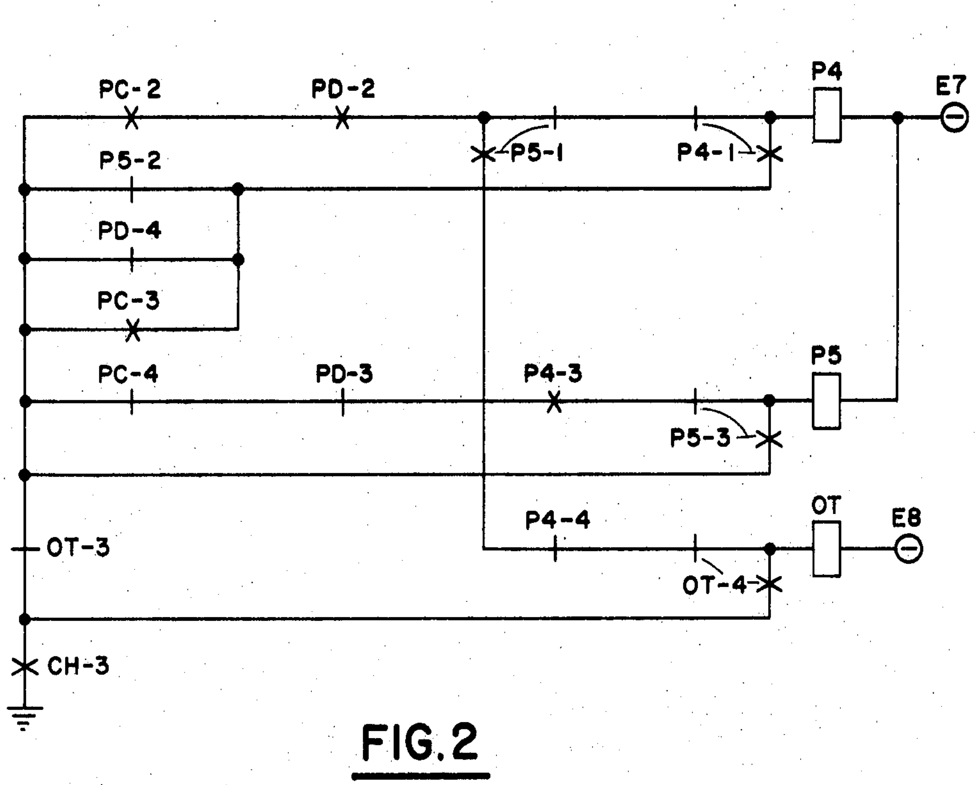
FIG. 2 illustrates a pulse counting circuit for counting a predetermined number of groups of pulses.

When relays PC and PD operate after the sixth pulse, relay P4 in FIG. 2 operates through the circuit comprising potential source E7, relay P4, released contacts P4–1 and P5–1, operated contacts PC–2 and PD–2, released contacts OT–3, operated contacts CH–3 and ground. Relay P4 locks operated through its own contacts P4–1 and released contacts P5–2 or operated contacts PC–3. The operation of relay P4 opens contacts P4–2 in the call register circuit FIG. 3 for preventing a false registration of the call register.

When relays PC and PD are released after the 12th pulse, relay P5 is energized through the circuit comprising potential source E7, relay P5, released contacts P5–3, operated contacts P4–3, released contacts PC–4 and PD–3, released contacts OT–3, operated contacts CH–3 and ground. Relay P5 locks operated through its own contacts. Relay P4 remains operated through released contacts PD–4.

When relays PC and PD are operated after the 18th pulse, relay P4 remains operated through contacts PC–3. Relay P5 also remains operated since its holding circuit does not include any contacts of relays PC and PD.

When the 24th ground pulse is applied, relay PC is released opening contacts PC–3. Since relay PD is not released until the 24th ground pulse is removed, relay P4 is not held operated by contacts PD–4 and is consequently released. Relay P5 alone remains energized.

When relays PC and PD are operated after the 30th pulse, relay OT is energized through the circuit comprising potential source E8, relay OT, released contacts OT–4, and P4–4, operated contacts P5–1, PC–2 and PD–2, released contacts OT–3, operated contacts CH–3 and ground. Relay OT locks operated for the remaining duration of the call through its own contacts OT–4 and operated contacts CH–3. The operation of relay OT released relays PC and PD at contacts OT–1 and OT–2 to release the second flip-flop 11 and to prevent further operation of the second counting circuit. In addition, it releases relay P5 at contacts OT–3.

Figure 3:
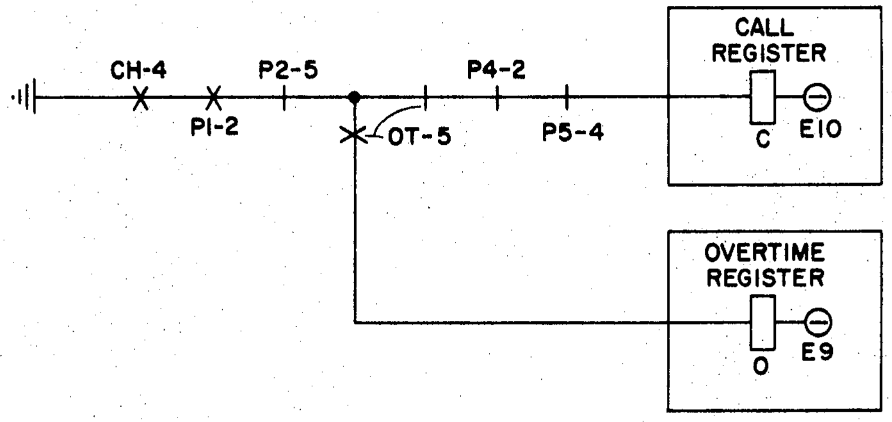
FIG. 3 illustrates a register circuit.

The operation of relay OT also closes contacts OT–5 in FIG. 3 to prepare the operate path of relay O of the overtime register. The overtime register is subsequently energized once every sixth pulse, for the remaining duration of the call, when contacts P1–2 of the pulse counting relay P1 in FIG. 1 are closed. The overtime register is not disclosed in detail since it is well known in the art.

At the end of the call, ground is removed from the CH lead FIG. 1 which releases relay CH. The release of relay CH releases all operated relays by opening contacts CH–1, CH–2, CH–3, CH–4 and CH–5.

We claim:

1. A timing circuit for measuring the duration of a call on a telephone line comprising:

a. an overtime register;

b. pulse generating means responsive to the initiation of a call for generating timed pulses for at least the duration of said call;

c. first counting means for repeatedly counting a predetermined number of said pulses, each of said predetermined number of pulses forming a group of pulses, said counting means producing an output pulse each time a group of pulses has been counted;

d. second counting means responsive to the output pulses from said first counting means for producing an output pulse when a predetermined number of said groups of pulses has been counted;

e. means responsive to the output pulse of said second counting means for conditioning the overtime register and for disabling said second counting means; and f. means for enabling the conditioned overtime register thereafter in response to the first pulse of each succeeding group of pulses for the duration of the call.

2. A timing circuit as defined in claim 1 wherein said first counting means comprises a first flip-flop circuit responsive to said timed pulses, and first pulse counting relays responsive to said first flip-flop circuit for counting said predetermined number of pulses and producing said output pulses from said first counting means.

3. A timing circuit as defined in claim 2 wherein said second counting means comprises a second flip-flop circuit responsive to the output pulses from said first counting means, and second pulse counting relays responsive to said second flip-flop circuit for counting predetermined number of groups of pulses and producing said output pulse from said second counting means.

4. A timing circuit as defined in claim 3 wherein said means responsive to the output pulse of the second counting means is a relay.

5. A timing circuit as defined in claim 4 wherein said relay disables the second flip-flop circuit.

6. A timing circuit as defined in claim 5 wherein said means for enabling the conditioned overtime register comprises a predetermined relay of said first pulse counting relays.